US009485563B2

(12) United States Patent
Chaabani

(10) Patent No.: US 9,485,563 B2
(45) Date of Patent: Nov. 1, 2016

(54) TWO WAY COMMUNICATION ASSEMBLY

(71) Applicant: Firas Chaabani, Bronx, NY (US)

(72) Inventor: Firas Chaabani, Bronx, NY (US)

( * ) Notice: Subject to any disclaimer, the term of this patent is extended or adjusted under 35 U.S.C. 154(b) by 0 days.

(21) Appl. No.: 14/459,759

(22) Filed: Aug. 14, 2014

(65) Prior Publication Data

US 2016/0050482 A1 Feb. 18, 2016

(51) Int. Cl.
*H04B 7/00* (2006.01)
*H04R 1/00* (2006.01)
*H04R 1/10* (2006.01)

(52) U.S. Cl.
CPC ......... *H04R 1/1041* (2013.01); *H04R 2420/05* (2013.01); *H04R 2420/07* (2013.01)

(58) Field of Classification Search
CPC H04R 5/033; H04R 1/1041; H04R 2420/07; H04W 84/18; H04W 88/06
See application file for complete search history.

(56) References Cited

U.S. PATENT DOCUMENTS 4,845,751 A * 7/1989 Schwab ................. H04H 20/88 381/105
5,794,127 A * 8/1998 Lansang .............. H04R 1/1041 340/12.5
5,946,604 A * 8/1999 Bailey .................. G10H 1/0083 361/679.4
5,974,304 A * 10/1999 Chen ...................... H04B 1/086 455/351
6,118,882 A 9/2000 Haynes
6,519,448 B1 2/2003 Dress et al.
6,671,494 B1 * 12/2003 James .................... H04B 1/385 381/15
D562,808 S 2/2008 Gwee
7,555,134 B2 6/2009 Dunn et al.
7,877,121 B2 1/2011 Seshadri et al.
2003/0118196 A1 * 6/2003 Woolfork ............. H04R 1/1091 381/74
2005/0124414 A1 * 6/2005 Hussaini ................. A63F 13/02 463/35
2008/0153556 A1 6/2008 Oh
2008/0166005 A1 7/2008 Terlizzi et al.
2008/0242229 A1 10/2008 Sharma
2009/0154739 A1 6/2009 Zellner
2011/0110529 A1 * 5/2011 Semcken ............. H04B 1/0343 381/74

* cited by examiner

*Primary Examiner* — Simon Sing

(57) ABSTRACT

A two way communication assembly for discrete wireless communication includes a remote unit that may be coupled to an external electronic device. A remote processor is coupled to the remote unit. A remote transceiver is coupled to the remote unit and the remote processor. A remote actuator is coupled to the housing and the remote transceiver. A base unit may be positioned within a user's ear. A base processor is coupled to the base unit. A base transceiver is coupled to the base unit and the base processor. The base transceiver is in communication with the remote transceiver. A first base actuator is coupled to the base unit and the base processor. A second base actuator is coupled to the base unit and the base transceiver. A microphone is coupled to the base unit and the base processor. A speaker is coupled to the base unit and the base processor.

17 Claims, 4 Drawing Sheets

TWO WAY COMMUNICATION ASSEMBLY

BACKGROUND OF THE DISCLOSURE

Field of the Disclosure

The disclosure relates to two way communication devices and more particularly pertains to a new two way communication device for discrete wireless communication.

SUMMARY OF THE DISCLOSURE

An embodiment of the disclosure meets the needs presented above by generally comprising a remote unit that may be operationally coupled to an external electronic device. A remote processor is coupled to the remote unit. A remote transceiver is coupled to the remote unit. the remote transceiver is operationally coupled to the remote processor. A remote actuator is coupled to the housing. The remote actuator is operationally coupled to the remote transceiver. The remote actuator selectively actuates the remote transceiver. A base unit may be positioned within a user's ear. A base processor is coupled to the base unit. A base transceiver is coupled to the base unit. The base transceiver is operationally coupled to the base processor. The base transceiver is in communication with the remote transceiver. A first base actuator is coupled to the base unit. The first base actuator is operationally coupled to the base processor. The first base actuator selectively actuates the base processor. A second base actuator is coupled to the base unit. The second base actuator is operationally coupled to the base transceiver. The second base actuator selectively actuates the base transceiver. A microphone is coupled to the base unit. The microphone may receive the user's voice. The microphone is operationally coupled to the base processor. A speaker is coupled to the base unit. The speaker may direct sound into the user's ear. The speaker is operationally coupled to the base processor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
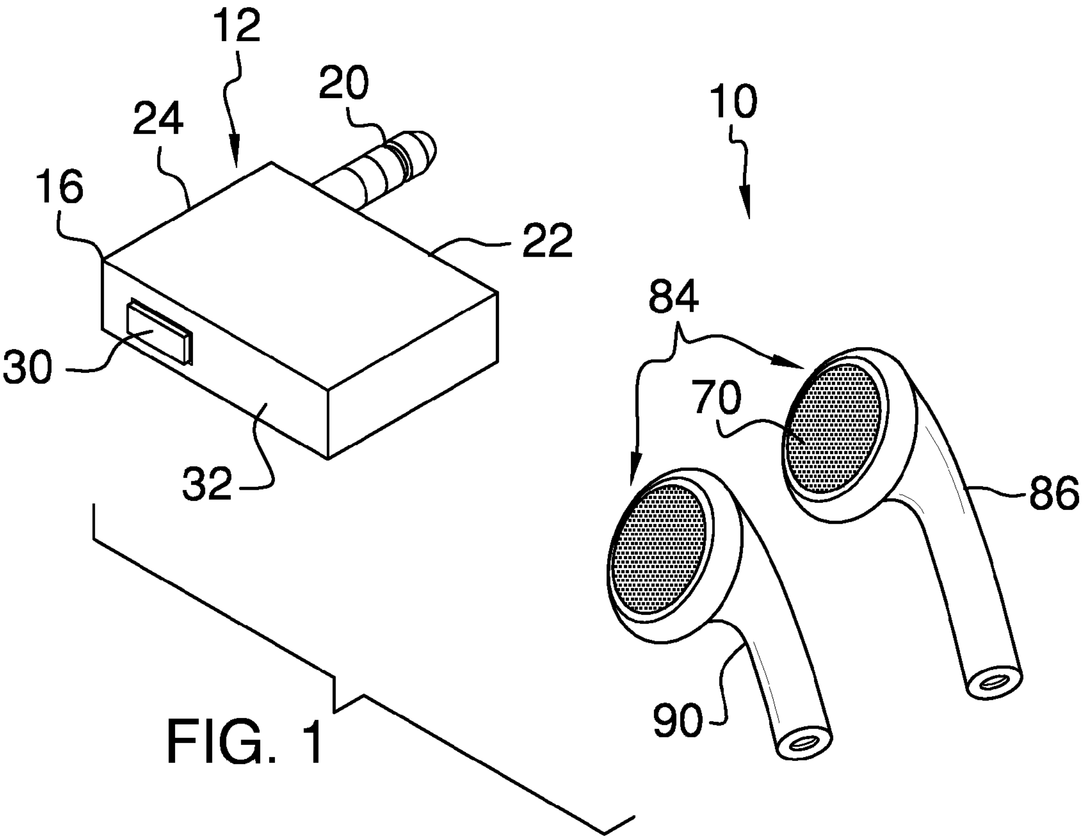
FIG. 1 is a perspective view of a two way communication assembly according to an embodiment of the disclosure.
Figure 2:
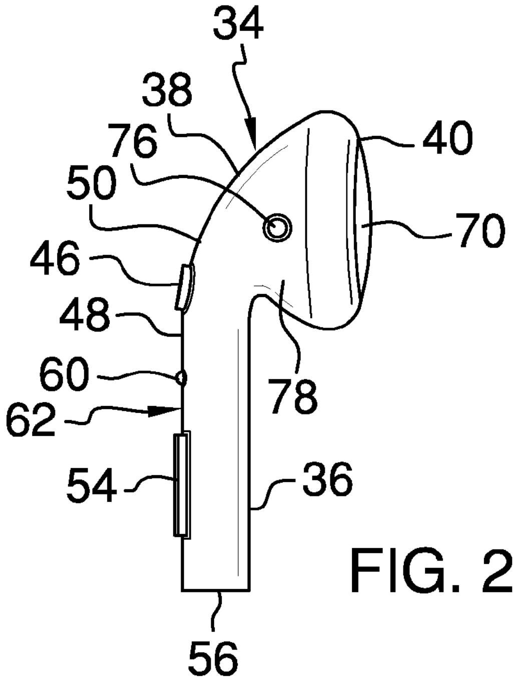
FIG. 2 is a right side view of an embodiment of the disclosure.
Figure 3:
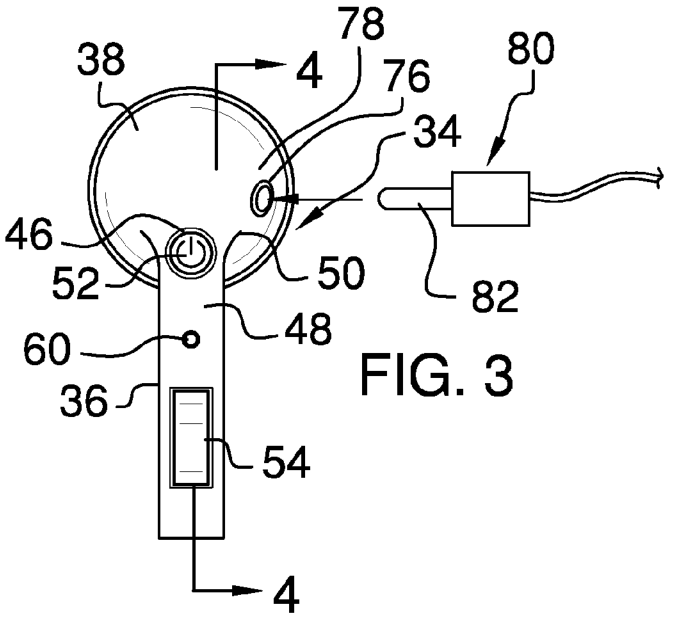
FIG. 3 is a back view of an embodiment of the disclosure.
Figure 4:
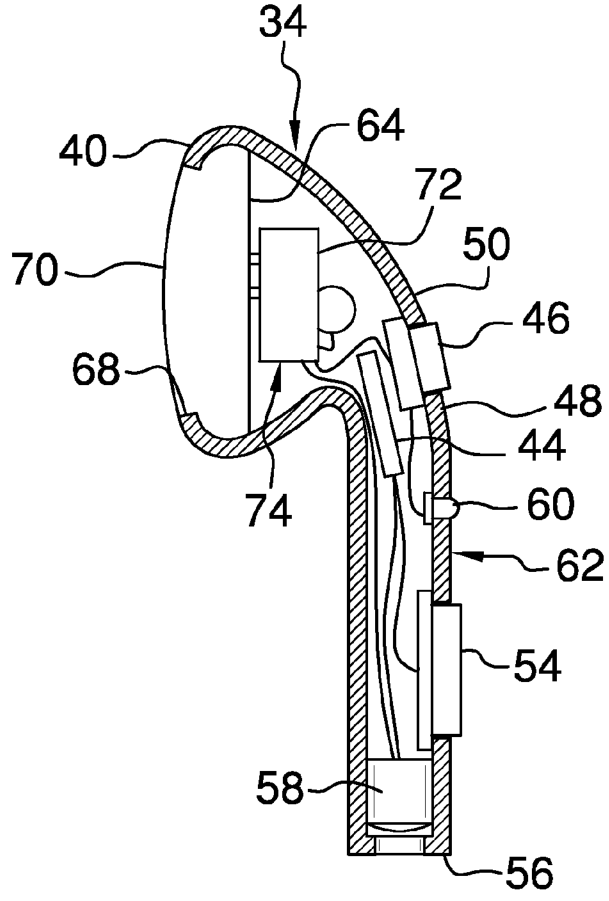
FIG. 4 is a cross sectional view taken along line 4-4 if FIG. 3 of an embodiment of the disclosure.
Figure 5:
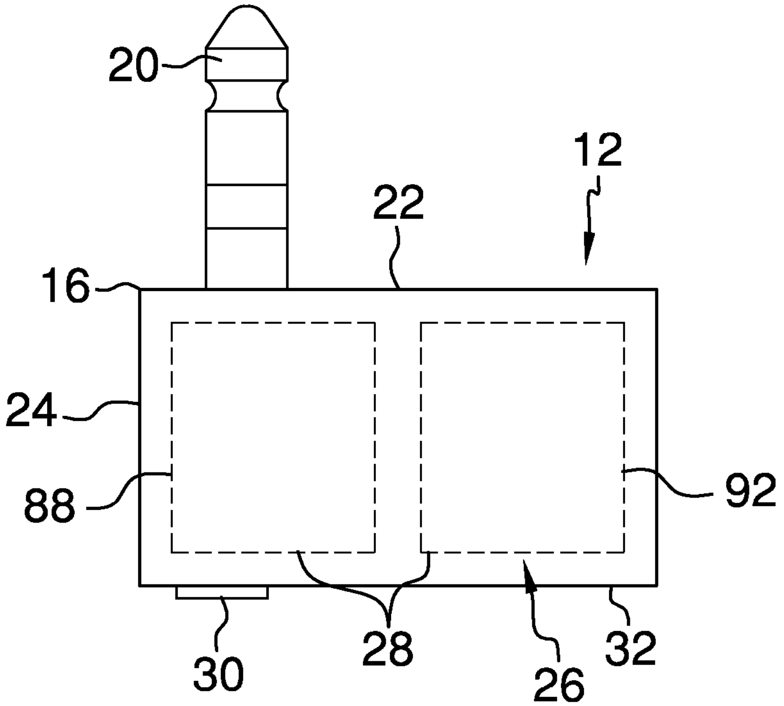
FIG. 5 is a top view of an embodiment of the disclosure.
Figure 6:
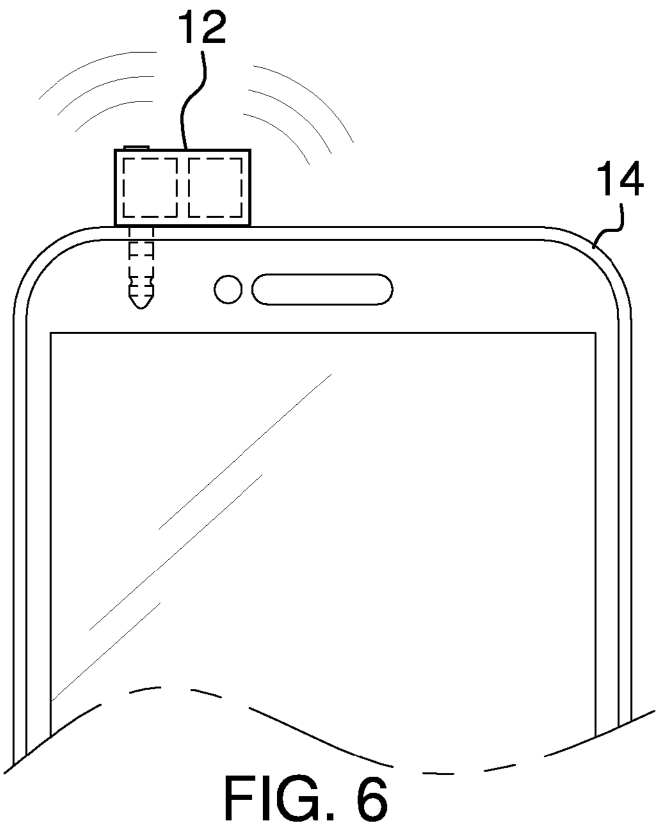
FIG. 6 is an in-use view of an embodiment of the disclosure.
Figure 7:
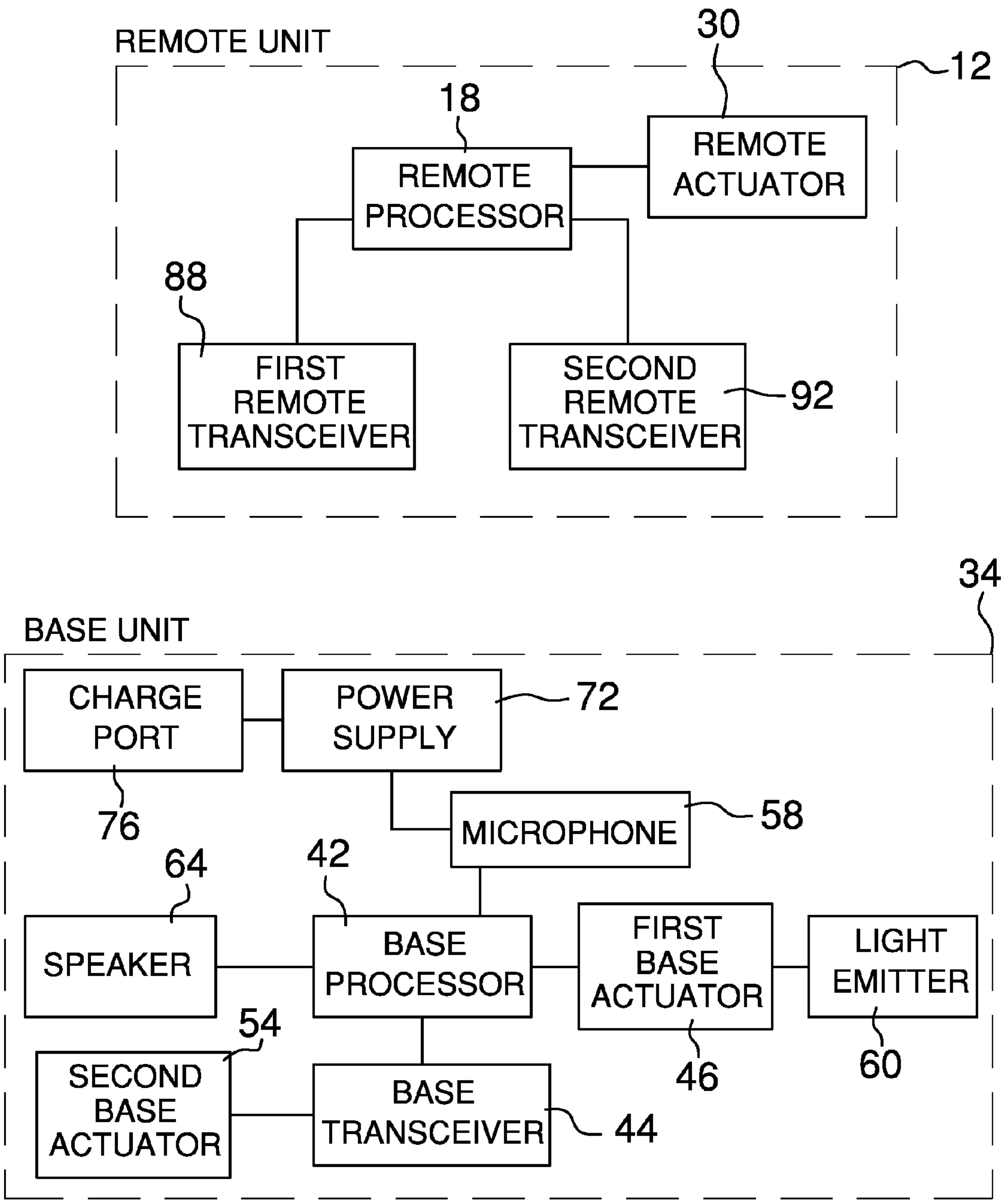
FIG. 7 is a schematic view of an embodiment of the disclosure.

With reference now to the drawings, and in particular to FIGS. 1 through 7 thereof, a new two way communication device embodying the principles and concepts of an embodiment of the disclosure and generally designated by the reference numeral 10 will be described.

As best illustrated in FIGS. 1 through 7, the two way communication assembly 10 generally comprises a remote unit 12 that may be operationally coupled to an external electronic device 14. The external electronic device 14 may be a Smartphone of any conventional design. Continuing, and outer wall 16 of the remote unit 12 may have a width being greater than a length of the outer wall 16 of the remote unit 12. The remote unit 12 may have a parallelepiped shape that may have a width between 12 mm and 25 mm, a length between 6 mm and 12 mm and a depth between 3 mm and 6 mm.

A remote processor 18 is coupled to the remote unit 12. The remote processor 18 may be an electronic processor of any conventional design. A jack 20 is coupled to and extends laterally away from a front side 22 of the outer wall 16 of the remote unit 12 proximate a first lateral side 24 of the outer wall 16 of the remote unit 12. The jack 20 is electrically coupled to the remote processor 18. Moreover, the jack 20 is selectively electrically coupled to the external electronic device 14. Lastly, the jack 20 may be a ¼ inch stereo jack of any conventional design.

A remote transceiver 26 is coupled to the remote unit 12. The remote transceiver 26 is electrically coupled to the remote processor 18. Additionally, the remote transceiver 26 may be an RF transceiver of any conventional design. Lastly, the remote transceiver 26 is one of a pair of the remote transceivers 28.

A remote actuator 30 is coupled to a back side 32 of the outer wall 16 of the remote unit 12 proximate the first lateral side 24 of the outer wall 16 of the remote unit 12. The remote actuator 30 is electrically coupled to the remote processor 18. Additionally, the remote actuator 30 selectively actuates the remote transceiver 26. The remote transceiver 26 generates a Wireless Personal Access Network signal when the remote actuator 30 is actuated.

A base unit 34 is provided. The base unit 34 may be positioned within a user's ear. Continuing, a lower portion 36 of the base unit 34 extends downwardly from an upper portion 38 of the base unit 34. The base unit 34 has a comma shape. Moreover, the upper portion 38 of the base unit 34 is positionable in the user's ear so the base unit 34 is retained in the user's ear. A round front end 40 of the upper portion 38 of the base unit 34 may have a diameter between 8 mm and 12 mm. Lastly, the lower portion 36 of the base unit 34 may have a length between 12 mm and 20 mm.

A base processor 42 is coupled to the base unit 34. The base processor 42 may be an electronic processor of any conventional design. A base transceiver 44 is coupled to the base unit 34. The base transceiver 44 is electrically coupled to the base processor 42. Moreover, the base transceiver 44 is in electromagnetic communication with the remote transceiver 26. The base transceiver 44 may be an RF transceiver of any conventional design.

A first base actuator 46 is coupled to a back 48 of the lower portion 36 of the base unit 34 proximate a top 50 of the lower portion 36 of the base unit 34. The first base actuator 46 is electrically coupled to the base processor 42. Moreover, the first base actuator 46 selectively actuates the base processor 42. Indicia 52 is printed on the first base actuator 46. The indicia 52 may comprise a power symbol.

A second base actuator 54 is coupled to the back 48 of the lower portion 36 of the base unit 34 proximate an open bottom end 56 of the lower portion 36 of the base unit 34. The second base actuator 54 is electrically coupled to the base transceiver 44. Additionally, the second base actuator 54 selectively actuates the base transceiver 44. The base transceiver 44 generates a Wireless Personal Area Network signal when the second base actuator 54 is actuated.

A microphone 58 is coupled to the lower portion 36 of the base unit 34 proximate the open bottom end 56 of the lower portion 36 of the base unit 34. The microphone 58 may receive the user's voice. Moreover, the microphone 58 is electrically coupled to the base processor 42. The microphone 58 may be of any conventional design.

A light emitter 60 is coupled to the back 48 of the lower portion 36 of the base unit 34 proximate a middle 62 of the lower portion 36 of the base unit 34. The light emitter 60 is electrically coupled to the first base actuator 46. Moreover, the light emitter 60 emits light when the first base actuator 46 is actuated. Lastly, the light emitter 60 may be an LED of any conventional design.

A speaker 64 is coupled to the upper portion 38 of the base unit 34 proximate a round front end 66 of the upper portion 38 of the base unit 34. A speaker opening 68 extends through the round front end 66 of the upper portion 38 of the base unit 34 so the speaker 64 may direct sound into the user's ear. Additionally, a screen 70 covers the speaker opening 68. Lastly, the speaker 64 is electrically coupled to the base processor 42.

A power supply 72 is coupled to the base unit 34. The power supply 72 is electrically coupled to the base processor 42. Moreover, the power supply 72 comprises at least one rechargeable battery 74. A charge port 76 is coupled to a first lateral side 78 of the upper portion 38 of the base unit 34. The charge port 76 is electrically coupled to the power supply 72. Further, the charge port 76 is selectively electrically coupled to a power source 80 so the charge port 76 charges the power supply 72. The power source 80 may be a charger jack 82.

The base unit 34 is one of a pair of the base units 84. Further, the pair of base units 84 each is positionable in an associated one of the user's ears. The base transceiver 44 in a first one of the pair of base units 86 is placed in selective electromagnetic communication with a first one of the pair of remote transceivers 88. Lastly, the base transceiver 44 in a second one of the pair of base units 90 is placed in selective electromagnetic communication with a second one of the pair of remote transceivers 92.

In use, the remote unit 12 is electrically coupled to the external electronic device 14. The first base actuator 46 is actuated on each of the first 86 and second 90 base units. Continuing, the remote actuator 30 is actuated so each of the first 88 and second 92 remote transceivers is placed in electromagnetic communication with the base transceiver 44 in an associated one of the first 86 and second 90 base units. The second base actuator 54 on a selected one of the first 86 or second 90 base units is actuated to use the microphone 58 on the associated first 86 or second 90 base units. When the selected second base actuator 54 is actuated, base transceiver 44 in the associated one of the pair of base units 84 is placed in electromagnetic communication with the base transceiver 44 in the remaining one of the pair of base units 84. The microphone 58 in the associated one of the pair of base units 84 allows verbal communication to be transmitted to the remaining one of the pair of base units 84.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A two way communication assembly for discrete wireless communication, said assembly comprising:

a remote unit configured to be operationally coupled to an external electronic device;

a remote processor coupled to said remote unit;

a remote transceiver coupled to said remote unit, said remote transceiver being operationally coupled to said remote processor;

a remote actuator coupled to said housing, said remote actuator being operationally coupled to said remote transceiver wherein said remote actuator selectively actuates said remote transceiver;

a base unit configured to be positioned within a user's ear;

a base processor coupled to said base unit;

a base transceiver coupled to said base unit, said base transceiver being operationally coupled to said base processor, said base transceiver being in communication with said remote transceiver;

a first base actuator coupled to said base unit, said first base actuator being operationally coupled to said base processor wherein said first base actuator selectively actuates said base processor;

a second base actuator coupled to said base unit, said second base actuator being operationally coupled to said base transceiver wherein said second base actuator selectively actuates said base transceiver;

a microphone coupled to said base unit wherein said microphone is configured to receive the user's voice, said microphone being operationally coupled to said base processor; and a speaker coupled to said base unit wherein said speaker is configured to direct sound into the user's ear, said speaker being operationally coupled to said base processor.

2. The assembly according to claim 1 further comprising:

a jack coupled to and extending laterally away from a front side of an outer wall of said remote unit proximate a first lateral side of said outer wall of said remote unit;

said jack being electrically coupled to said remote processor; and said jack being selectively electrically coupled to the external electronic device.

3. The assembly according to claim 1 further comprising:

said remote transceiver being electrically coupled to said remote processor; and said remote transceiver being one of a pair of said remote transceivers.

4. The assembly according to claim 1 further comprising:

said remote actuator being coupled to a back side of an outer wall of said remote unit proximate a first lateral side of said outer wall of said remote unit; and said remote actuator being electrically coupled to said remote processor.

5. The assembly according to claim 1 further comprising:

a lower portion of said base unit extending downwardly from an upper portion of said base unit wherein said base unit has a comma shape; and said upper portion of said base unit being positionable in the user's ear wherein said base unit is retained in the user's ear.

6. The assembly according to claim 1 further comprising:

said base transceiver being electrically coupled to said base processor; and said base transceiver being in electromagnetic communication with said remote transceiver.

7. The assembly according to claim 1 further comprising said first base actuator being electrically coupled to said base processor.

8. The assembly according to claim 1 further comprising said second base actuator being electrically coupled to said base transceiver.

9. The assembly according to claim 1 further comprising:

said microphone being coupled to a lower portion of said base unit proximate a bottom end of said lower portion of said base unit; and said microphone being electrically coupled to said base processor.

10. The assembly according to claim 1 further comprising:

said speaker being coupled to an upper portion of said base unit proximate a front end of said upper portion of said base unit; and said speaker being electrically coupled to said base processor.

11. The assembly according to claim 1 further comprising:

a power supply coupled to said base unit;

said power supply being electrically coupled to said base processor; and said power supply comprising at least one battery.

12. The assembly according to claim 1 further comprising a charge port coupled to an upper portion of said base unit.

13. The assembly according to claim 12 further comprising said charge port being electrically coupled to a power supply.

14. The assembly according to claim 13 further comprising said charge port being selectively electrically coupled to a power source wherein said charge port charges said power supply.

15. The assembly according to claim 1 further comprising said base unit being one of a pair of said base units.

16. The assembly according to claim 15 further comprising said pair of base units each being positionable in an associated one of the user's ears.

17. A two way communication assembly for discrete wireless communication, said assembly comprising:

a remote unit configured to be operationally coupled to an external electronic device;

a remote processor coupled to said remote unit;

a jack coupled to and extending laterally away from a front side of an outer wall of said remote unit proximate a first lateral side of said outer wall of said remote unit, said jack being electrically coupled to said remote processor, said jack being selectively electrically coupled to the external electronic device;

a remote transceiver coupled to said remote unit, said remote transceiver being electrically coupled to said remote processor, said remote transceiver being one of a pair of said remote transceivers;

a remote actuator coupled to a back side of said outer wall of said remote unit proximate a first lateral side of said outer wall of said remote unit, said remote actuator being electrically coupled to said remote processor wherein said remote actuator selectively actuates said remote transceiver;

a base unit configured to be positioned within a user's ear, a lower portion of said base unit extending downwardly from an upper portion of said base unit wherein said base unit has a comma shape, said upper portion of said base unit being positionable in the user's ear wherein said base unit is retained in the user's ear;

a base processor coupled to said base unit;

a base transceiver coupled to said base unit, said base transceiver being electrically coupled to said base processor, said base transceiver being in electromagnetic communication with said remote transceiver;

a first base actuator coupled to said base unit, said first base actuator being electrically coupled to said base processor wherein said first base actuator selectively actuates said base processor;

a second base actuator coupled to said base unit, said second base actuator being electrically coupled to said base transceiver wherein said second base actuator selectively actuates said base transceiver;

a microphone coupled to said lower portion of said base unit proximate a bottom end of said lower portion of said base unit wherein said microphone is configured to receive the user's voice, said microphone being electrically coupled to said base processor;

a speaker coupled to said upper portion of said base unit proximate a front end of said upper portion of said base unit wherein said speaker is configured to direct sound into the user's ear, said speaker being electrically coupled to said base processor;

a power supply coupled to said base unit, said power supply being electrically coupled to said base processor, said power supply comprising at least one battery;

a charge port coupled to said upper portion of said base unit, said charge port being electrically coupled to said power supply, said charge port being selectively electrically coupled to a power source wherein said charge port charges said power supply; and said base unit being one of a pair of said base units, said pair of base units each being positionable in an associated one of the user's ears.

* * * * *